United States Patent
White, III et al.

(10) Patent No.: US 11,436,586 B2
(45) Date of Patent: Sep. 6, 2022

(54) SYSTEMS AND METHODS FOR ACCOUNT AGNOSTIC TRANSACTION ROUTING

(71) Applicant: JPMorgan Chase Bank, N.A., New York, NY (US)

(72) Inventors: James P. White, III, Middletown, DE (US); Eric Han Kai Chang, Wilmington, DE (US); Howard Spector, Woolwich, NJ (US); William F. Mann, III, Avondale, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 64 days.

(21) Appl. No.: 15/989,942

(22) Filed: May 25, 2018

(65) Prior Publication Data

US 2018/0349882 A1 Dec. 6, 2018

Related U.S. Application Data

(60) Provisional application No. 62/512,420, filed on May 30, 2017.

(51) Int. Cl.
*G06Q 20/22* (2012.01)
*G06Q 20/02* (2012.01)
(Continued)

(52) U.S. Cl.
CPC ......... *G06Q 20/227* (2013.01); *G06Q 20/027* (2013.01); *G06Q 20/20* (2013.01); *G06Q 20/405* (2013.01); *G06N 20/00* (2019.01)

(58) Field of Classification Search
None
See application file for complete search history.

(56) References Cited

U.S. PATENT DOCUMENTS

2008/0255947 A1 10/2008 Friedman
2011/0251892 A1* 10/2011 Laracey ............ G06Q 30/0253
705/14.51
(Continued)

OTHER PUBLICATIONS

Woyke, Elizabeth, PayPal's Coolest Mobile Wallet Feature: The Oops Button, Nov. 1, 2011, Forbes, entire document pertitent, retrieved from https://www.forbes.com/sites/elizabethwoyke/2011/11/01/paypals-coolest-mobile-wallet-feature-the-oops-button/#7f1aa18a11d7 (Year: 2011).*

(Continued)

*Primary Examiner* — Gregory S Cunningham, II
(74) *Attorney, Agent, or Firm* — Greenberg Traurig LLP

(57) ABSTRACT

Systems and methods for account agnostic transaction routing are disclosed. According to one embodiment, in an information processing device comprising at least one computer processor, a method for account agnostic transaction routing may include: (1) receiving an identifier for a first financial instrument for a transaction being conducted at a point of transaction; (2) retrieving a plurality of financial instruments associated with the identifier, the plurality of financial instruments comprising the first financial instrument; (3) retrieving at least one transaction routing rule associated with the plurality of financial instruments, the transaction routing rule specifying a condition for using one of the plurality of financial instruments; (4) identifying one of the plurality of financial instruments for conducting the transaction based on the transaction and the transaction routing rule; and (5) settling the transaction with the identified financial instrument.

18 Claims, 2 Drawing Sheets

(51) Int. Cl.
*G06Q 20/40* (2012.01)
*G06Q 20/20* (2012.01)
*G06N 20/00* (2019.01)

(56) References Cited

U.S. PATENT DOCUMENTS

| | | | |
|---|---|---|---|
| 2012/0259716 A1* | 10/2012 | Rosenberger | G06Q 40/12 |
| | | | 705/16 |
| 2012/0310760 A1* | 12/2012 | Phillips | G06Q 20/227 |
| | | | 705/26.1 |
| 2014/0058950 A1* | 2/2014 | Gupta | G06Q 20/10 |
| | | | 705/44 |
| 2015/0324766 A1* | 11/2015 | Park | G06Q 20/3572 |
| | | | 705/39 |
| 2015/0332246 A1* | 11/2015 | Lafeer | G06Q 20/227 |
| | | | 705/44 |
| 2016/0192123 A1* | 6/2016 | Lim | G06Q 20/202 |
| | | | 455/41.1 |
| 2016/0197885 A1 | 7/2016 | Sorin et al. | |
| 2017/0140385 A1* | 5/2017 | Dobson | G06Q 20/4016 |
| 2018/0240094 A1* | 8/2018 | Perez | G06Q 20/401 |
| 2018/0240108 A1* | 8/2018 | Boss | G06Q 20/3676 |
| 2018/0315038 A1* | 11/2018 | Rezayee | H04W 76/10 |
| 2019/0340604 A1* | 11/2019 | Nadella | G06Q 20/227 |

OTHER PUBLICATIONS

U.S. Appl. No. 15/957,331 filed Apr. 2018, Spector.
International Searching Authority, PCT International Search Report and Written Opinion, International Application No. PCT/US18/34608, dated Aug. 23, 2018, pp. 1-7.

* cited by examiner

SYSTEMS AND METHODS FOR ACCOUNT AGNOSTIC TRANSACTION ROUTING

RELATED APPLICATIONS

This application claims priority to U.S. Provisional Patent Application Ser. No. 62/512,420, filed May 30, 2017. The disclosure of this document is hereby incorporated, by reference, in its entirety.

BACKGROUND OF THE INVENTION

1. Field of the Invention

The present disclosure generally relates to systems and methods for account agnostic transaction routing.

2. Description of the Related Art

Different credit cards are often associated with different benefits. For example, one credit card may issue cash-back rewards; another may have a low interest rate. Some give frequent flyer miles, and others give preferred status. In order to full take advantage of these benefits, a consumer must know which card gives the best benefit before conducting a transaction, and must have that card on his or her person to conduct the transaction with that credit card.

SUMMARY OF THE INVENTION

Systems and methods for account agnostic transaction routing are disclosed. According to one embodiment, in an information processing device comprising at least one computer processor, a method for account agnostic transaction routing may include: (1) receiving an identifier for a first financial instrument for a transaction being conducted at a point of transaction; (2) retrieving a plurality of financial instruments associated with the identifier, the plurality of financial instruments comprising the first financial instrument; (3) retrieving at least one transaction routing rule associated with the plurality of financial instruments, the transaction routing rule specifying a condition for using one of the plurality of financial instruments; (4) identifying one of the plurality of financial instruments for conducting the transaction based on the transaction and the transaction routing rule; and (5) settling the transaction with the identified financial instrument.

In one embodiment, the condition may include a transaction amount, a transaction type, a merchant, a customer benefit associated with each of the plurality of financial instruments, etc. The customer benefit may include a reward earned, a discount, etc.

In one embodiment, at least two of the plurality of financial instruments may be issued by different issuers.

In one embodiment, the step of settling the transaction with the identified financial instrument may include routing the transaction to an issuer associated with the identified financial instrument.

In one embodiment, the method may further include splitting the transaction between two of the plurality of financial instruments.

In one embodiment, the transaction routing rule may be based on machine learning from at least one prior transaction.

In one embodiment, the transaction routing rule may be received from a third party.

In one embodiment, the transaction routing rule may be dynamic.

According to another embodiment, a system for account agnostic transaction routing may include a point of transaction receiving a transaction and an identifier for a first financial instrument from a customer; a backend receiving the transaction and the identifier for the first financial instrument from the point of transaction; and a transaction rules database. The backend may retrieve a plurality of financial instruments associated with the identifier, the plurality of financial instruments comprising the first financial instrument; retrieve at least one transaction routing rule associated with the plurality of financial instruments from a transaction rules database, the transaction routing rule specifying a condition for using one of the plurality of financial instruments; identify one of the plurality of financial instruments for conducting the transaction based on the transaction and the transaction routing rule; and settle the transaction with the identified financial instrument.

In one embodiment, the condition may include a transaction amount, a transaction type, a merchant, or a customer benefit associated with each of the plurality of financial instruments.

In one embodiment, the customer benefit may include rewards earned or a discount.

In one embodiment, the transaction may be routed to an issuer associated with the identified financial instrument.

In one embodiment, the transaction routing rules may be received from a third party.

According to another embodiment, a system for account agnostic transaction routing may include: a point of transaction receiving a transaction and an identifier for a first financial instrument from a customer; a backend receiving the transaction and the identifier for the first financial instrument from the point of transaction; a transaction rules database; and a customer electronic device hosting an electronic wallet comprising a plurality of financial instruments including the first financial instrument. The customer electronic device may retrieve at least one transaction routing rule associated with the plurality of financial instruments from a transaction rules database, the transaction routing rule specifying a condition for using one of the plurality of financial instruments, and may identify one of the plurality of financial instruments for conducting the transaction based on the transaction and the transaction routing rule. The backend may settle the transaction with the identified financial instrument.

In one embodiment, the transaction routing rules may be received from a third party.

In one embodiment, the merchant may split the transaction and may use its own APIs. This may keep the merchant and financial institution systems synchronized.

In one embodiment, the routing and other portions of the process may be stored to a distributed ledger (e.g., a block chain). This provides evidence that the transaction has not been tampered with.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein related to systems and methods for account agnostic transaction routing.

In one embodiment, a customer may associate a plurality of financial accounts, such as a credit account, deposit account, line of credit, crypto currency, etc. as well as their financial instruments (e.g., physical cards, tokens, etc.). The customer may also define one or more transaction routing rule for routing a transaction to one or more of these accounts. Exemplary transaction routing rules may include routing the transaction based on a transaction time, a location, an identity of a merchant, a type of merchant, an amount of transaction, an interest rate, a line of credit, a tax benefit, rewards points that may be earned, a spending category, etc. Any suitable rule, or combination of rules, may be used as is necessary and/or desired.

In one embodiment, machine learning may be used to define, or assist in defining the transaction routing rules based on prior customer behavior.

At a point of purchase, such as a point of sale or a point of transaction, the customer may present one of the associated financial instruments to pay for the transaction. The transaction may be routed to the issuer of the financial instrument; if transaction routing is enabled, a back-end may apply the transaction routing rules to the transaction, and the transaction is charged to the appropriate account(s).

In one embodiment, when the financial instrument is used at an ATM, the financial instrument may behave as a proxy for an ATM card and may access the preferred account specified by the customer.

Figure 1:
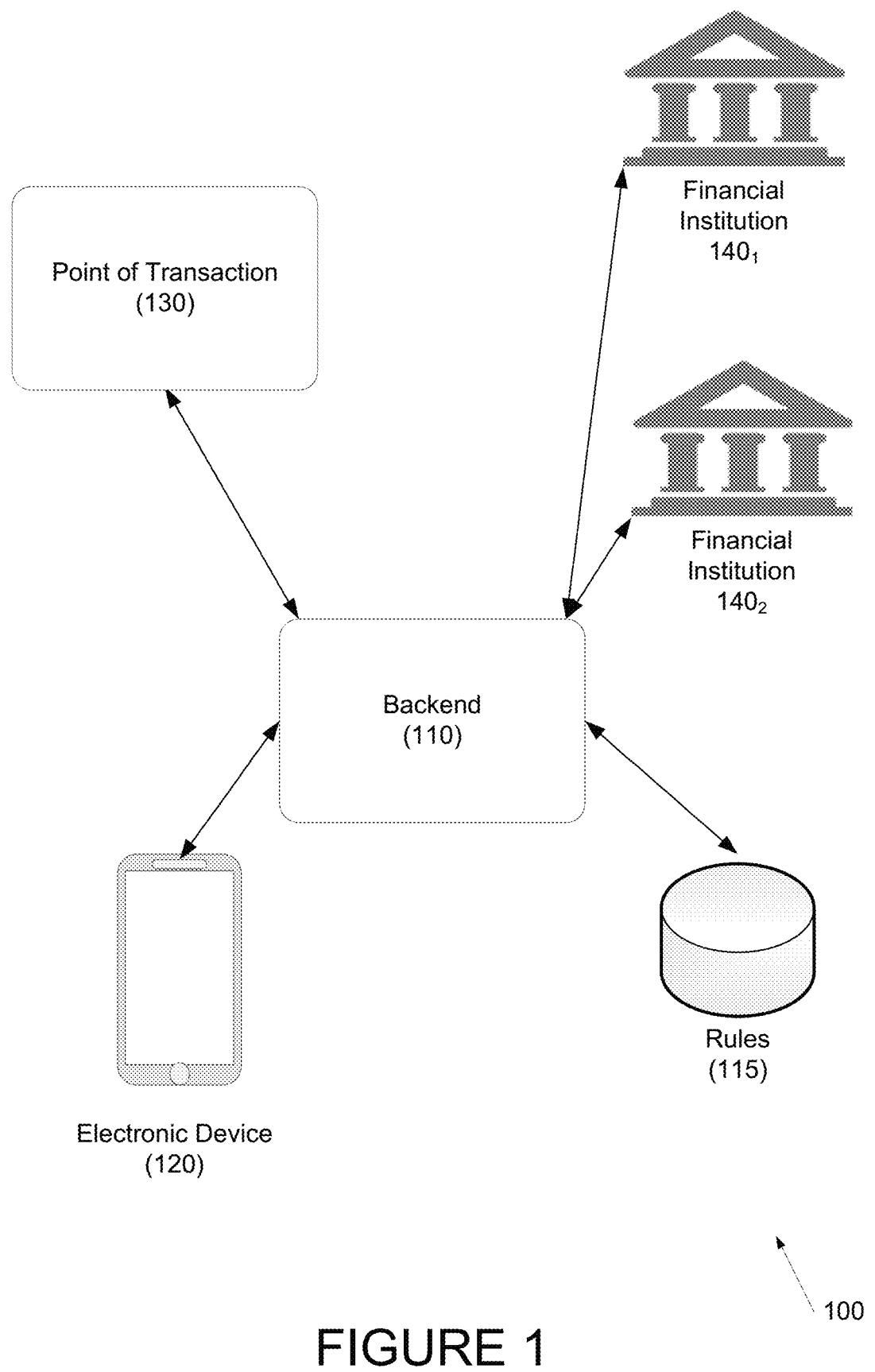
FIG. 1 depicts a system for account agnostic transaction routing according to one embodiment.

Referring to FIG. 1, a system for account agnostic transaction routing is disclosed according to one embodiment. System 100 may include backend 110, rules database 115, user electronic device 120, point of transaction 130, and one or more financial institution 140.

In one embodiment, backend 110 may communicate with electronic device 120, and may receive one or more transaction routing rule from electronic device 120 and store the rule(s) in rules database 115. Rules database 115 may also store an association among different accounts for a user (e.g., transaction accounts, savings accounts, deposit accounts, lines of credit, etc.). In one embodiment, the accounts may be with the same financial institution, with different financial institutions, etc.

In one embodiment, rules database 115 may be internal to one of the financial institutions 140; in another embodiment, rules database 115 may be stored with, or associated with the electronic device 120.

In still another embodiment, rules database 115 may be provided by a third party (not shown) that may provide transaction routing rules that may be applied to a customer's transaction. Thus, the customer may, in effect, outsource the management of the customer's transactions to the third party which will then provide transaction routing rules. The third party may provide opportunities for the customer to receive discounts, additional rewards, take advantage of market conditions, etc.

In one embodiment, the transaction routing rules may be periodically downloaded to electronic device 120, and may be applied in the regular transaction flow in place of internal or customer-specified transaction routing rules. For example, electronic device 120 may apply the transaction routing rules to a pending transaction.

In another embodiment, backend 110 may apply the transaction routing rules to a pending transaction.

In one embodiment, the transaction routing rules may be dynamic, such as for a promotion that may run for a limited period of time, or in response to changing market conditions. For example, a third party may develop different arbitrage techniques, which may gain benefits of scale and being able to take quick advantage of changes in the market place.

In one embodiment, rules database 115 may be stored in the cloud.

Backend 110 may also receive transactions, directly or indirectly, from one or more point of transaction 130 (e.g., point of sale devices), apply one or more transaction routing rule from rules database 115, and route the transaction to one or more financial institution 140.

In one embodiment, the routing may go to a partner (e.g., a non-financial entity). For example, a financial institution may use airline points by routing a portion of the transaction to the airline.

In one embodiment, one or more of financial institutions 140 may issue rewards (e.g., reward points).

Figure 2:
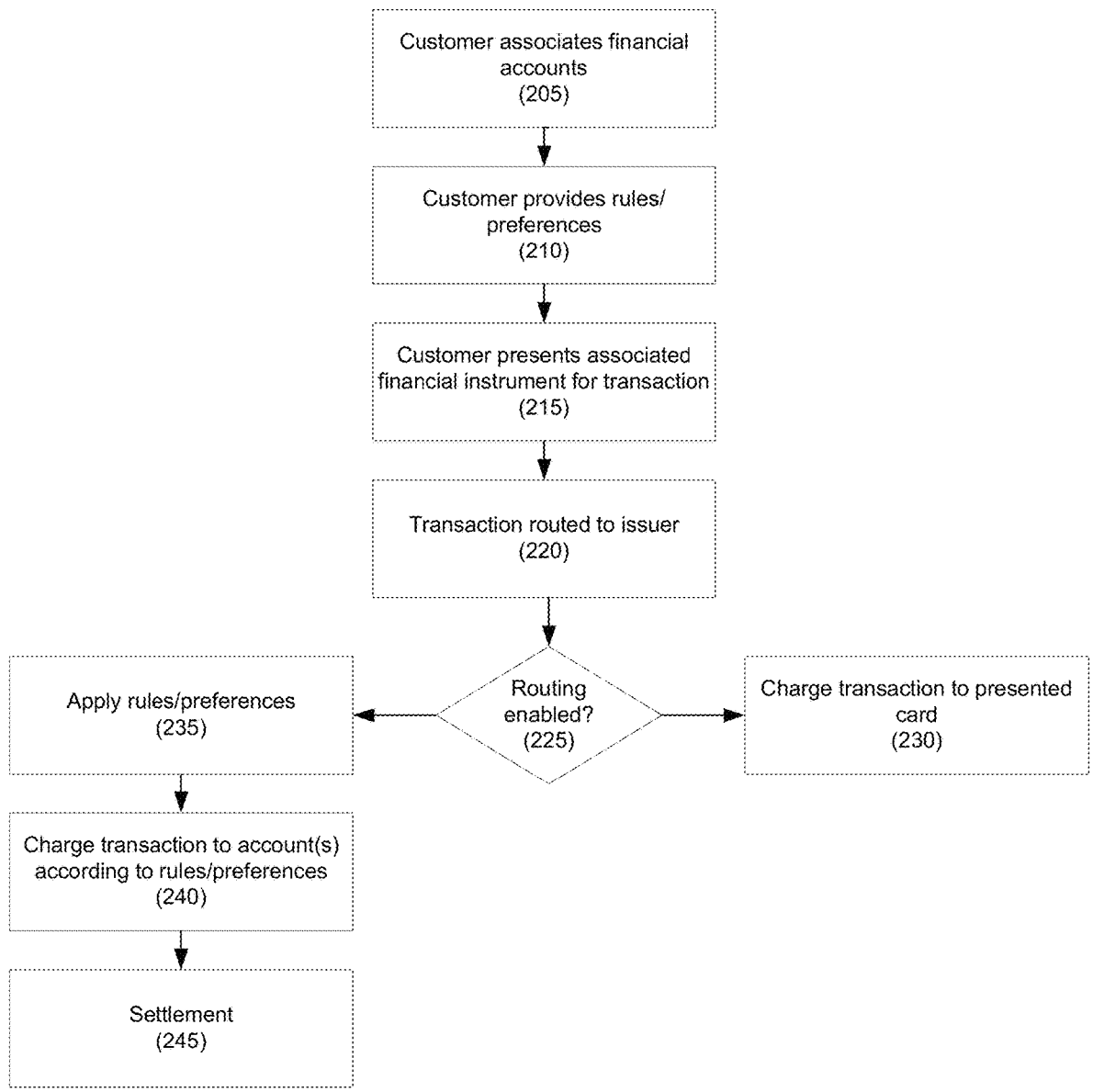
FIG. 2 depicts a method for account agnostic transaction routing according to one embodiment.

Referring to FIG. 2, a flowchart of a method for account agnostic transaction routing is provided according to one embodiment.

In step 205, a customer may associate a plurality of accounts, such as transaction accounts, savings accounts, deposit accounts, lines of credit, etc. Thus, when the customer identifies one account, the accounts that are linked may be retrieved. In one embodiment, the financial instruments associated with these accounts (e.g., credit cards, tokens, etc.) may also be associated.

In one embodiment, the accounts may be with different financial institutions.

In one embodiment, the accounts may be automatically associated if they are in the same electronic wallet.

In step 210, the customer may define one or more transaction routing rule to be applied when a transaction is conducted using one of the associated accounts. In one embodiment, the customer may set transaction routing rules based on, for example, transaction amount, transaction location, transaction time, merchant identification, merchant type, transaction amount, potential rewards, potential discounts, etc. In one embodiment, the customer may permit the financial institution to determine the best account(s) to use to maximize a goal (e.g., reward points, cash-back, discounts, etc.). Any other transaction routing rule may be used as is necessary and/or desired.

In one embodiment, the transaction routing rules may specify a plurality of accounts for the transaction, the manner in which the transaction is divided among a plurality of accounts, etc.

In one embodiment, the transaction routing rules may be provided by a third party.

In one embodiment, machine learning may be used to set or update transaction routing rules. For example, if a customer always uses Account A with Merchant A, the system may set that as a transaction routing rule. If the customer always uses Account B when travelling, then the system may set that as a transaction routing rule. In one embodiment, the customer may be asked to confirm the transaction routing rule as is necessary and/or desired.

Examples of transaction routing rules include: (1) a customer wants all home improvement related purchases to be routed to a home equity line of credit; (2) the customer wants all international purchases to be routed to a travel card because it does not have a foreign transaction fee; (3) the customer wants all Amazon purchases to go to the customer's Amazon Rewards card, because the customer receives double points; (4) the customer wants the financial institution to figure out where best to route the transaction to maximize reward points; and (5) the customer wants all purchases from merchant "X" to be routed to the customer's checking account. Other transaction routing rules may be set as necessary and/or desired.

The user may set up a priority among the different transaction routing rules in case of a conflict. In another embodiment, the customer may set up goals (e.g., prefer cash back, prefer points, etc.) to resolve conflicts.

In another embodiment, the customer may be asked to resolve the conflict. In another embodiment, the customer may defer the decision until a later time.

Next, in step 220, the transaction may be routed to the issuer of the financial instrument that was presented. In one embodiment, the transaction may be routed to a payment switch. Examples of payment switches are disclosed in U.S. patent application Ser. No. 15/957,331 and U.S. Provisional Patent Application Ser. No. 62/487,025, the disclosures of which are hereby incorporated by reference in their entireties.

In step 225, if transaction routing is not enabled, in step 130, the transaction may be charged to the presented financial instrument.

In step 225, if transaction routing is enabled, in step 235, the transaction routing rules may be applied to the transaction to identify the account(s) to charge the transaction to, and in step 240, the transaction may be charged to the account(s).

In one embodiment, the customer may be asked to confirm the account(s) for the transaction. In one embodiment, this confirmation may be at the POS, on the customer's electronic device, etc. In one embodiment, this may occur after the customer conducts the transaction.

In one embodiment, the manner in which the conflict was manually resolved may be used to resolve future conflicts.

In one embodiment, any pending transaction may be manually routed to any other account by the customer.

In step 245, if one of the account(s) that was selected is with a financial institution that is not associated with the presented financial instrument, the transaction may be routed to that financial institution for processing, and that financial institution may take over the transaction. In another embodiment, the first financial institution may authorize the transaction with the second financial institution. For example, if the selected account is with Financial Institution B, Financial Institution A could authorize the transaction and pass the transaction to Financial Institution B. If Financial Institution B rejects the transaction, Financial Institution A may then keep the transaction and the customer may be notified.

In another embodiment, the customer's available credit across two or more credit accounts with one or more financial institutions may be aggregated and presented as a single financial account or instrument, and may be made available as a single line of credit.

In one embodiment, the customer may pay a single invoice for all accounts. For example, the payment may be automatically distributed to the associated accounts with priority to pay against accounts with higher interest or balance.

In one embodiment, if one of the financial instruments for one of the associated accounts is compromised, transactions with another associated financial instrument may still be routed to that account. The compromised financial instrument may be deactivated so that transactions cannot be conducted with that financial instrument.

As noted above, the transaction may be split into two or more portions. In one embodiment, the merchant may split the transaction and may use its own APIs. This may keep the merchant and financial institution systems synchronized.

In one embodiment, the transaction, the routing of the transaction, etc. may be stored to a distributed ledger (e.g., a block chain).

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for account agnostic transaction routing, comprising:
   receiving, in a backend computing system of a first financial institution comprising at least one computer processor and from a point of transaction device, a transaction being conducted at the point of transaction device and an identifier for a first financial instrument issued by the first financial institution and for the transaction being conducted at the point of transaction device, the first financial instrument identifying a primary financial account associated therewith;
   determining, by the backend computing system of the first financial institution that account agnostic transaction routing is enabled for the primary financial account;
   retrieving, by a customer electronic device hosting an electronic wallet comprising a plurality of secondary financial accounts including the primary financial account, at least one transaction routing rule associated with the plurality of secondary financial accounts from a transaction rules database, wherein the at least one transaction routing rule is received at the transaction rules database from a third party, and wherein the transaction routing rule specifies a condition for selecting one of the plurality of secondary financial accounts;
   identifying, by the customer electronic device, one of the plurality of secondary financial accounts for conducting the transaction based on the transaction and the transaction routing rule, wherein the identified secondary financial account is issued by a second financial institution; and
   settling, by the backend computing system of the first financial institution and a backend computing system of the second financial institution, the transaction, wherein settling the transaction comprises:
   routing by the backend computing system of the first financial institution, the transaction to the backend computing system of the second financial institution that issued the identified secondary financial account for settlement;
   responsive to receiving, by the backend computing system of the first financial institution and from the backend computing system of the second financial institution, a rejection of authorization from the second financial institution that issued the identified secondary financial account, settling the transaction with the primary financial account;
   responsive to receiving, by the backend computing system of the first financial institution and from the backend computing system of the second financial institution, an authorization from the financial institution associated with the selected second financial account, settling the transaction with the identified secondary financial account; and
   notifying, based on the settlement, a customer that is associated with the primary financial account and the secondary financial account.

2. The method of claim 1, wherein the condition comprises a transaction amount.

3. The method of claim 1, wherein the condition comprises a transaction type.

4. The method of claim 1, wherein the condition comprises a merchant.

5. The method of claim 1, wherein the condition comprises a customer benefit associated with each of the plurality of secondary financial accounts.

6. The method of claim 5, wherein the customer benefit comprises rewards earned.

7. The method of claim 5, wherein the customer benefit comprises a discount.

8. The method of claim 1, wherein at least two of the plurality of secondary financial accounts are issued by different issuers.

9. The method of claim 1, further comprising:
   splitting the transaction between two of the plurality of financial instruments.

10. The method of claim 1, wherein the transaction routing rule is based on machine learning from at least one prior transaction.

11. The method of claim 1, wherein the transaction routing rule is dynamic.

12. A system for account agnostic transaction routing, comprising:
   a point of transaction device receiving a transaction and an identifier for a first financial instrument issued by a first financial institution from a customer;
   a backend computing system for the first financial institution receiving the transaction and the identifier for the first financial instrument from the point of transaction device, the first financial instrument identifying a primary financial account associated therewith;
   a backend computing system of a second financial institution;
   a transaction rules database; and
   a customer electronic device hosting an electronic wallet comprising a plurality of secondary financial accounts including the primary financial account;
   wherein:

the backend computing system of the first financial institution determines that account agnostic transaction routing is enabled for the primary financial account;

the customer electronic device retrieves at least one transaction routing rule associated with the plurality of secondary financial accounts from the transaction rules database, wherein the at least one transaction routing rule is received at the transaction rules database from a third party, and wherein the transaction routing rule specifying a condition for selecting one of the plurality of secondary financial accounts;

the customer electronic device identifies one of the plurality of secondary financial accounts for conducting the transaction based on the transaction and the transaction routing rule, wherein the identified secondary financial account is issued by the second financial institution; and the backend computing system of the first financial institution and a backend computing system of the second financial institution settles the transaction, and wherein settling the transaction comprises:

routing by the backend computing system of the first financial institution, the transaction to the backend computing system of the second financial institution that issued the identified secondary financial account for settlement;

responsive to receiving, by the backend computing system of the first financial institution and from the backend computing system of the second financial institution, a rejection of authorization from the second financial institution that issued the identified secondary financial account, settling the transaction with the primary financial account;

responsive to receiving, by the backend computing system of the first financial institution and from the backend computing system of the second financial institution, an authorization from the financial institution associated with the selected second financial account, settling the transaction with the identified secondary financial account; and the backend computing system notifies based on the settlement, a customer that is associated with the primary financial account and the secondary financial account.

13. The system of claim 12, wherein the condition comprises a transaction amount.

14. The system of claim 12, wherein the condition comprises a transaction type.

15. The system of claim 12, wherein the condition comprises a merchant.

16. The system of claim 12, wherein the condition comprises a customer benefit associated with each of the plurality of secondary financial accounts.

17. The system of claim 16, wherein the customer benefit comprises rewards earned.

18. A non-transitory computer readable storage medium, including instructions stored thereon for account agnostic transaction routing, which when read and executed by one or more computers cause the one or more computers to perform steps comprising:

receiving, in a backend computing system of a first financial institution comprising at least one computer processor and from a point of transaction device, a transaction being conducted at the point of transaction device and an identifier for a first financial instrument issued by the first financial institution and for the transaction being conducted at the point of transaction device, the first financial instrument identifying a primary financial account associated therewith;

determining, by the backend computing system of the first financial institution that account agnostic transaction routing is enabled for the primary financial account;

retrieving, by a customer electronic device hosting an electronic wallet comprising a plurality of secondary financial accounts including the primary financial account, at least one transaction routing rule associated with the plurality of secondary financial accounts from a transaction rules database, wherein the at least one transaction routing rule is received at the transaction rules database from a third party, and wherein the transaction routing rule specifies a condition for selecting one of the plurality of secondary financial accounts;

identifying, by the customer electronic device, one of the plurality of secondary financial accounts for conducting the transaction based on the transaction and the transaction routing rule, wherein the identified secondary financial account is issued by a second financial institution; and settling, by the backend computing system of the first financial institution and a backend computing system of the second financial institution, the transaction, wherein settling the transaction comprises:

routing by the backend computing system of the first financial institution, the transaction to the backend computing system of the second financial institution that issued the identified secondary financial account for settlement;

responsive to receiving, by the backend computing system of the first financial institution and from the backend computing system of the second financial institution, a rejection of authorization from the second financial institution that issued the identified secondary financial account, settling the transaction with the primary financial account;

responsive to receiving, by the backend computing system of the first financial institution and from the backend computing system of the second financial institution, an authorization from the financial institution associated with the selected second financial account, settling the transaction with the identified secondary financial account; and notifying, based on the settlement, a customer that is associated with the primary financial account and the secondary financial account.

* * * * *